United States Patent
Cheng

(10) Patent No.: US 10,038,634 B2
(45) Date of Patent: Jul. 31, 2018

(54) METHOD OF ADDRESSING IOT DEVICE AND APPLYING SUCH FOR IOT CONNECTION

(71) Applicant: TRUSTED SOLUTIONS CORPORATION, New Taipei (TW)

(72) Inventor: Kuang Hung Cheng, New Taipei (TW)

(73) Assignee: TRUSTED SOLUTIONS CORPORATION, New Taipei (TW)

( * ) Notice: Subject to any disclaimer, the term of this patent is extended or adjusted under 35 U.S.C. 154(b) by 97 days.

(21) Appl. No.: 15/154,264

(22) Filed: May 13, 2016

(65) Prior Publication Data
US 2017/0331732 A1  Nov. 16, 2017

(51) Int. Cl.
| | | |
|---|---|---|
| H04L 12/28 | (2006.01) | |
| H04L 12/741 | (2013.01) | |
| H04L 12/44 | (2006.01) | |
| H04L 29/08 | (2006.01) | |
| H04L 29/12 | (2006.01) | |
| H04W 88/02 | (2009.01) | |

(52) U.S. Cl.
CPC .............. *H04L 45/74* (2013.01); *H04L 12/44* (2013.01); *H04L 61/2514* (2013.01); *H04L 69/329* (2013.01); *H04W 88/02* (2013.01)

(58) Field of Classification Search
CPC ..... H04L 12/08; H04L 12/44; H04L 61/2514; H04L 69/329; H04L 12/28
See application file for complete search history.

(56) References Cited

U.S. PATENT DOCUMENTS

| | | | | |
|---|---|---|---|---|
| 2007/0130185 A1* | 6/2007 | Miller | ................ | G06F 17/30961 |
| 2009/0146833 A1* | 6/2009 | Lee | ................... | H04L 29/12584 340/9.13 |
| 2013/0227114 A1* | 8/2013 | Vasseur | ................. | H04L 41/044 709/224 |
| 2014/0222975 A1* | 8/2014 | Vasseur | ................. | H04L 41/142 709/220 |
| 2014/0223155 A1* | 8/2014 | Vasseur | ................. | G06F 9/4405 713/2 |
| 2014/0244834 A1 | 8/2014 | Guedalia et al. | | |
| 2015/0030024 A1* | 1/2015 | Venkataswami | ........ | H04L 45/74 370/392 |
| 2015/0288655 A1* | 10/2015 | Narasimhamurthy | | H04L 61/255 370/475 |
| 2016/0140567 A1* | 5/2016 | Hanna | .............. | G06Q 20/40145 705/44 |
| 2016/0149856 A1* | 5/2016 | Hui | ..................... | H04L 61/2015 370/252 |

(Continued)

*Primary Examiner* — Andrew Lee
(74) *Attorney, Agent, or Firm* — Innovation Capital Law Group, LLP; Vic Lin

(57) ABSTRACT

A method of addressing IoT device and applying such for IoT connection adopts a design of global IoT addresses with a hierarchical structure and installs a virtual communication protocol into a physical communication protocol equivalent to the position of an application layer (Layer 7) of an OSI model, so that the virtual communication protocol is operated with the physical communication protocol online to allow two IoT devices with different physical communication protocols to communicate and transmit control commands with each other on an IOT with a hierarchical tree structure and achieve the communication between IoT devices in a quick and low-cost manner.

10 Claims, 5 Drawing Sheets

(56) References Cited

U.S. PATENT DOCUMENTS

2016/0262081 A1* 9/2016 Guo ..................... H04W 24/08
2017/0180340 A1* 6/2017 Smith .................... H04L 63/08
2017/0223700 A1* 8/2017 Thubert ............ H04W 72/0413
2017/0272310 A1* 9/2017 Rengarajan ............. H04L 41/08

* cited by examiner

METHOD OF ADDRESSING IOT DEVICE AND APPLYING SUCH FOR IOT CONNECTION

FIELD OF THE INVENTION

The present invention relates to a method of addressing an IoT device and applying such for an IoT connection, and more particularly to a design of a global IoT address with a hierarchical structure and capable of achieving mutual communications between two IoT devices of different physical communication protocols.

BACKGROUND OF THE INVENTION

In recent years, IoT and IoT devices bloom, and they are generally applied in the area of smart electric grids wherein public utilities units transmit optimal electric power to homes, the area of automations of home and building wherein smart home and buildings have central control of any device at home or in office, or the area of asset tracking wherein companies, hospitals, factories can track the position of a high-priced equipment, a patient or a motor vehicle accurately, but each IoT device generally has its own communication protocol and the communication between different communication protocols becomes very complicated, particularly in the transmission of control commands between hierarchically structured IoTs.

In view of the aforementioned problems of the communication of the conventional IoT, the inventor of the present invention provides an easy way for the communication between two IoT devices of different communication protocols and the transmission of control commands between these IoT devices to overcome the problems of the prior art.

SUMMARY OF THE INVENTION

It is a primary objective of the present invention to provide a method of addressing an IoT device and applying such for an IoT connection, and the method is executed in at least one IoT, and the IoT comes with a hierarchical tree structure. With the design of addressing a hierarchical structured global IoT, two IoT devices of different physical communication protocols can communicate or transmit control command with each other in the IoT of the hierarchical tree structure.

To achieve the aforementioned objective, the present invention provides a tree structure of an IoT, comprising:
a plurality of IoT devices, installed at a leaf node;
an IoT console, installed at a root node; and
a plurality of IoT consoles, installed at a middle layer;
  wherein, the IoT console installed at the root node has a unique IoT address; each IoT device and each of the plurality of IoT consoles installed at the middle layer have their own unique IoT address which is assigned by the IoT console of each respective parent node;
each IoT device has its own global IoT address which is composed of the IoT address of the IoT device and the IoT address of an ancestor node of the IoT console of the IoT device, and the global IoT address has a hierarchical structure; and
each IoT console has its own global IoT address which is composed of the IoT address of the IoT console and the IoT address of the IoT console of an ancestor node of the IoT console, and the global IoT address has a hierarchical structure.

Wherein, the global IoT address is composed of the plurality of IoT addresses arranged into a row and separated from one another by comma.

Wherein, the global IoT address is composed of the plurality of IoT addresses arranged into a row, and the global IoT addresses include an IoT address of the root node at the leftmost row, and then an IoT address of the child node arranged on the right of the previous IoT address, and so on and so forth until the IoT address is one arranged at the leaf node.

Wherein, the global IoT address is composed of the plurality of IoT addresses arranged into a row, and the global IoT addresses include an IoT address of the leaf node at the leftmost row, and then an IoT address of the parent node arranged on the right of the previous IoT address, and so on and so forth until the IoT address is one arranged at the root node.

Wherein, each of the plurality of IoT devices has its respective physical communication protocol equivalent to a position of an application layer (Layer 7) of the OSI model, and a virtual communication protocol, and each IoT device has a global IoT address set in each respective virtual communication protocol; the IoT console of an ancestor node of an IoT device has a plurality of physical communication protocols including a respective physical communication protocol of each IoT device or IoT console of the child node, and the physical communication protocols are equivalent to positions at the application layer (Layer 7) of the OSI model and each physical communication protocol has a virtual communication protocol, and each IoT console has a global IoT address set in each respective virtual communication protocol;
  each IoT device is connected to the IoT console of its parent node through the respective physical communication protocol and sends data for requesting an IoT address to the IoT console of its respective parent node, and then the IoT console of the parent node assigns a unique IoT address to the IoT device which requests for the data; and
  the IoT consoles not installed at the root node is connected to the IoT console of its parent node through the respective physical communication protocol and sends data for requesting an IoT address to the IoT console of its parent node, and then the IoT console of the parent node assigns a unique IoT address to the IoT console which requests for the data.

Wherein, after the IoT console of the parent node assigns a unique IoT address to the IoT device which requests for the data, the data transmitted from the IoT device to the connected IoT console is a first message packet, and the first message packet includes a respective physical communication protocol of the IoT device and a virtual communication protocol equivalent to a position of the application layer (Layer 7) of the OSI model, and the virtual communication protocol includes an IoT source address, an IoT target address and at least one IoT command or request; and the IoT source address is the global IoT address of the IoT device, and the IoT device has a communication destination: a target IoT device which is another IoT device of the IoT, and the IoT target address is the global IoT address of the target IoT device, and the IoT command or request is a command or request transmitted from the IoT device and executed by the target IoT device.

Wherein, the aforementioned method further comprises an IoT connection method, and the IoT connection method comprises the following steps:

Step 1: The IoT device transmits a first message packet to the IoT console of the parent node, and then Step 2 is executed.

Step 2: The IoT console examines whether the global IoT address of the target IoT device of the first message packet includes the IoT address of the IoT console, if yes, then Step 4 will be executed, or else Step 3 will be executed.

Step 3: The physical communication protocol of the first message packet is changed to the same physical communication protocol of the IoT console of its respective parent node, while keeping the virtual communication protocol unchanged, and then the first message packet is transmitted to the IoT console of the parent node of the IoT console, and Step 2 is executed.

Step 4: The IoT console resolves the first message packet by the IoT console and retrieves the virtual communication protocol from the first message packet, and puts the virtual communication protocol into a second message packet, and then transmits the second message packet to the target IoT device, and then Step 5 is executed.

Step 5: The target IoT device resolves the second message packet by the target IoT device and executes the IoT command or request of the virtual communication protocol in the second message packet.

Wherein, the second message packet of Step 4 includes a respective physical communication protocol of the child node of the IoT console, and the physical communication protocol includes a source address and a target address in compliance with its specification, so that the second message packet may be transmitted to the IoT console of the child node according to the physical communication protocol; and the virtual communication protocol retrieved from the first message packet in Step 4 is set into a second message packet, and the virtual communication protocol is set into the physical communication protocol of the second message packet equivalent to the position of the application layer (Layer 7) of the OSI model, so that the virtual communication protocol together with the physical communication protocol are transmitted to the IoT console of the child node; the second message packet obtained from the hierarchical structure of the global IoT address of the target IoT device of the virtual communication protocol is transmitted to a path of the target IoT device, and the IoT console of the child node changes the physical communication protocol of the second message packet into the physical communication protocol of the IoT console of each child node on the path layer by layer, while keeping the virtual communication protocol unchanged, so that the second message packet is transmitted to each node layer by layer, and finally the second message packet is transmitted to the target IoT device.

Wherein, the physical communication protocol includes TCP/IP communication protocol, Bluetooth, Zigbee communication protocol (Zigbee), RS-232, Wi-Fi, Long Term Evolution (LTE), Radio Frequency Identification (RFID) or Near Field Communication (NFC).

Wherein, the IoT console is a gateway, a router, a switch, or a sharer.

Wherein, the IoT console is a mobile device.

Wherein, the mobile device is a mobile phone, a notebook computer, a flat PC or a personal digital assistant.

Wherein, the physical communication protocols included in the IoT console are stored in a memory of the IoT console.

The technical characteristics, contents, advantages and effects of the present invention will be apparent with the detailed description of a preferred embodiment accompanied with the illustration of related drawings as follows.

DESCRIPTION OF THE PREFERRED EMBODIMENTS

Figure 1:
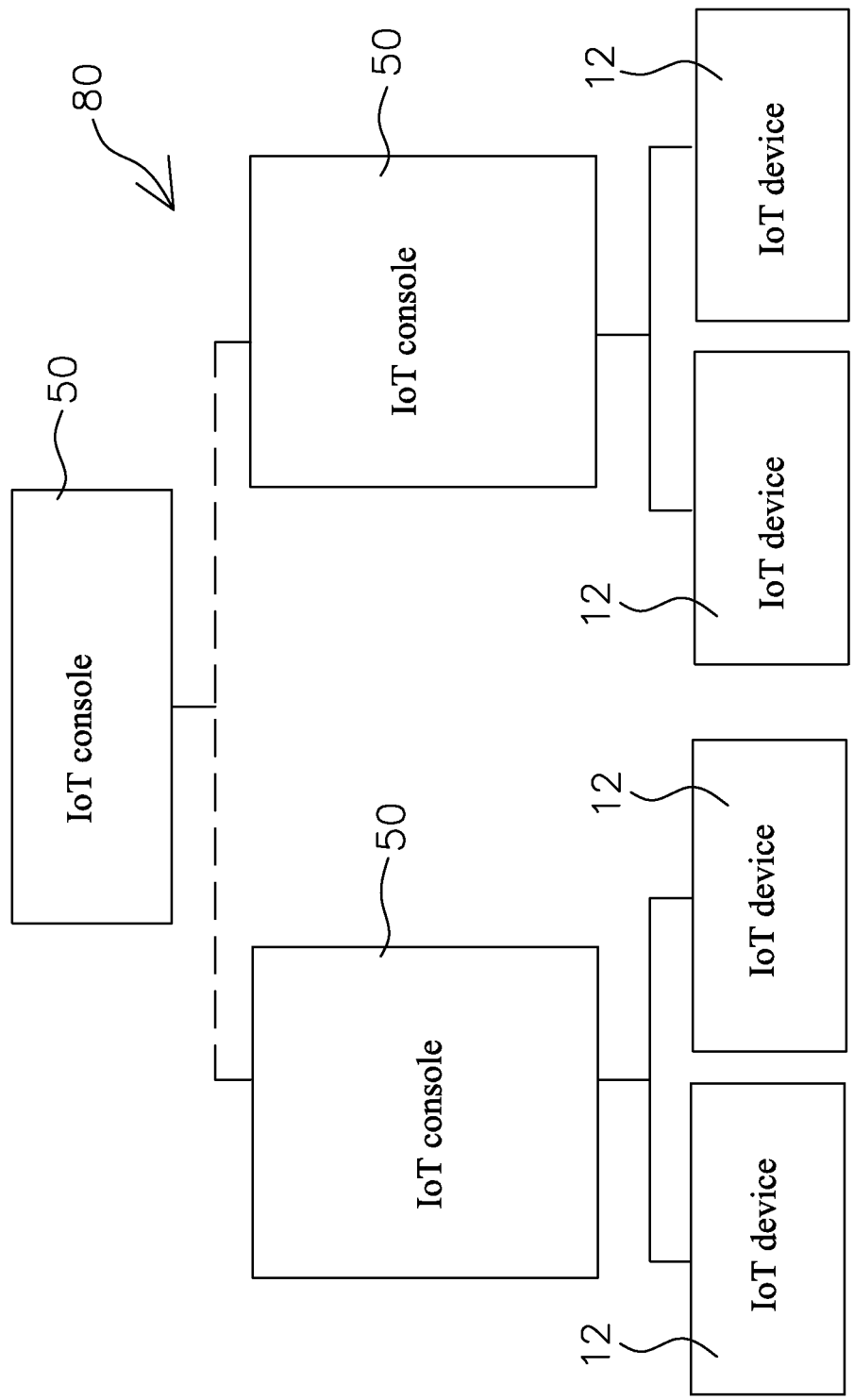
FIG. 1 is a block diagram of a structure of a first embodiment of the present invention.
Figure 2:
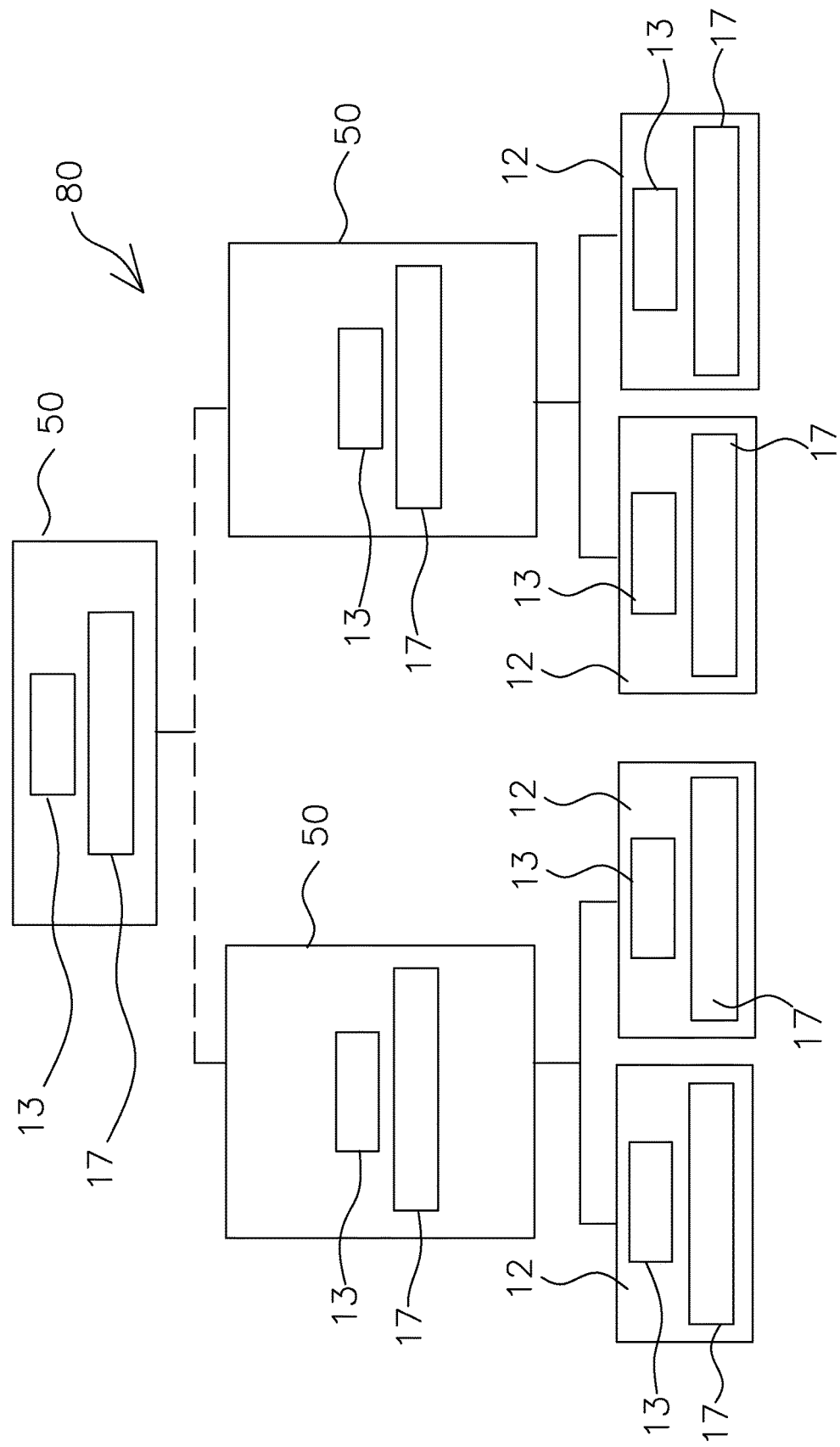
FIG. 2 is a block diagram of another structure of the first embodiment of the present invention.

With reference to FIGS. 1 and 2 for a method of addressing an IoT device (device of Internet of Things) in accordance with the first embodiment of the present invention, the IoT device is executed in at least one Internet of Things (IoT) 80, and the IoT 80 has a hierarchical tree structure which comprises:

a plurality of IoT devices 12, installed at a installed at a leaf node;

an IoT console 50, installed at a root node; and a plurality of IoT consoles 50, installed at a middle layer;

wherein the IoT console 50 installed at the root node has a unique IoT address 13, and each IoT device 12 and each of the plurality of IoT consoles 50 installed at the middle layer have their respective unique IoT address 13, and the IoT address 13 is assigned by the IoT console 50 of its respective parent node;

each IoT device 12 has its own global IoT address 17, which is composed of the IoT address 13 of the IoT device 12 and the IoT address 13 of the IoT console 50 of an ancestor node of the IoT device 12, and the global IoT address 17 has a hierarchical structure;

Each IoT console 50 has its own global IoT address 17, which is composed of the IoT address 13 of the IoT console 50 and the IoT address 13 of the IoT console 50 of an ancestor node of the IoT console 50, and the global IoT address 17 has a hierarchical structure.

In an example as shown in FIG. 2, the unique IoT address 13 of the IoT console 50 of installed at the root node is [highest gateway], and its global IoT address 17 is also [highest gateway], and the IoT console 50 of the root node is a parent node of the plurality of IoT consoles 50 of the middle layer, and the IoT console 50 installed at the root node assigns unique IoT address 13 to its respective child nodes respectively [No. 1 gateway] and [No. 2 gateway], so that the global IoT address 17 of the [No. 1 gateway] is [highest gateway.No. 1 gateway], the global IoT address 17 of the [No. 2 gateway] is [highest gateway.No. 2 gateway].

The IoT console 50 of the [No. 1 gateway] assigns a unique IoT address 13 to its respective child nodes respectively: [No. 1 mobile phone] and [No. 1 lightbulb], so that the global IoT address 17 of the [No. 1 mobile phone] is [highest gateway.No. 1 gateway.No. 1 mobile phone], and the global IoT address 17 of the [No. 1 lightbulb] is [highest gateway.No. 1 gateway.No. 1 lightbulb].

The IoT console 50 of the [No. 2 gateway] assigns a unique IoT address 13 to its respective child nodes, respectively: [No. 1 mobile phone] and [No. 1 thermometer], so that the global IoT address 17 of the [No. 1 mobile phone] is [highest gateway.No. 2 gateway.No. 1 mobile phone], and the global IoT address 17 of the [No. 1 thermometer] is [highest gateway.No. 2 gateway.No. 1 thermometer].

Wherein, the expression of the global IoT address 17 is not limited, as long as its shows the hierarchical relation of the IoT device 12 or the IoT console 50. For example, several IoT addresses 13 are arranged into a row and separated from one another by a comma, and an IoT address of the root node is arranged on the leftmost side, and then an IoT address of a child node is arranged on the right side of the previous IoT address, and so on and so forth, until the IoT address is the IoT address of the leaf node such as [highest gateway.No. 2 gateway.No. 1 thermometer]; or the global IoT address is formed by the plurality of IoT addresses arranged into a row, and an IoT address of the left node is arranged on the leftmost side, and then an IoT address of a parent node is arranged on the right side of the previous IoT address, and so on and so forth, until the IoT address is the IoT address of the root node such as [No. 1 thermometer.No. 2 gateway.highest gateway], or [No. 1 thermometer of No. 2 gateway of highest gateway].

The present invention adopts the aforementioned method of addressing the IoT device 12, so that each IoT device 12 on the IoT 80 has a unique global IoT address 17, wherein the global IoT address 17 has a hierarchical structure, and the global IoT address 17 shows that the IoT device 12 is situated at a position of the path of the IoT 80, and thus the invention allows any two IoT devices 12 on the IoT 80 to obtain a correct transmission path by their own global IoT address 17 in a signal transmission or instruction transmission.

Figure 3:
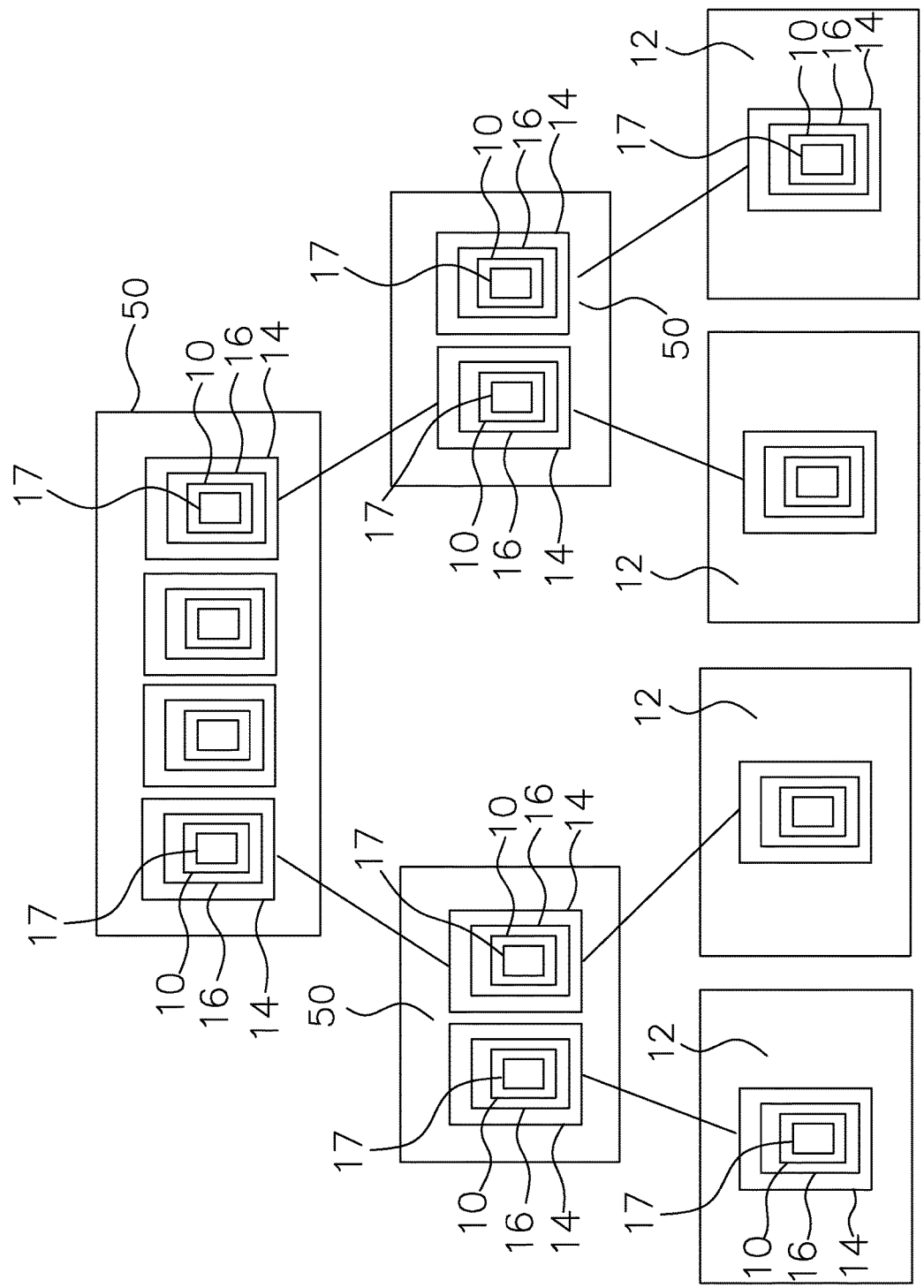
FIG. 3 is a block diagram of a method for an IoT console to assign a unique IoT address to an IoT device.

With reference to FIG. 3 for the method of assigning a unique IoT address 13 to the IoT device 12 by the IoT console 50 in accordance with the present invention, each of the plurality of IoT devices 12 has a respective physical communication protocol 14 which is equivalent to a position 16 at an application layer (Layer 7) of an OSI model and a virtual communication protocol 10, and the global IoT address 17 of each IoT device 12 is set into each respective virtual communication protocol 10.

The IoT console 50 of an ancestor node of each IoT device 12 includes a plurality of physical communication protocols 14 comprising at least a physical communication protocol 14 of an IoT device 12 of its respective child node or each IoT console 50, and the physical communication protocols 14 is equivalent to a position 16 at the application layer (Layer 7) of the OSI model and a virtual communication protocol 10, and the global IoT address 17 of each IoT console 50 is set into each respective virtual communication protocol 10.

Each IoT device 12 is connected to the IoT console 50 of its parent node through its respective physical communication protocol 14, and data for requesting an IoT address 13 are sent to the IoT console 50 of its parent node, and then the IoT console 50 of the parent node assigns a unique IoT address 13 to the IoT device 12 which requests for the data.

The physical communication protocol 14 not set into the IoT console 50 of the root node is connected to the IoT console 50 of its parent node, and data for requesting the IoT address 13 are transmitted to the IoT console 50 of its parent node, and then the IoT console 50 of the parent node assigns a unique IoT address 13 to the IoT console 50 which requests for data.

Wherein, the IoT device 12 refers to one having an addressable communication interface (such as Near Field Communication (NFC) ID, Internet Protocol (IP) address, Bluetooth Identification (ID) and capable of transmitting information to one or more of any other devices (such as sensors, electric appliances, etc) via a cable or wireless connection, and the IoT device 12 may come with a passive communication interface (such as NFC tag, quick response (QR) code, Radio Frequency Identification (RFID) tag, etc), or an active communication interface (such as transceiver, modem, etc), so that the IoT device 12 may include (but not limited to) a refrigerator, an oven, a baker, a microwave oven, a cooler, a dishwasher, a kitchenware, a hand tool, a washing machine, a drying machine, a stove, a heating and cooling machine, a television, a lamp, a vacuum cleaner, a sprinkler, etc, as long as it is equipped with an addressable communication interface capable of communicating with the IoT. Of course, the IoT device 12 may be a desktop computer, a notebook computer, a flat PC, a mobile phone, a personal digital assistant (PDA), etc.

Wherein, the IoT console 50 refers to a device capable of communicating with each IoT device 12 or any other IoT console 50, so that the IoT console 50 comprises the respective physical communication protocol 14 of the IoT devices 12 or any other IoT console 50, and the IoT console 50 can communicate with each IoT device 12 through each respective physical communication protocol 14 of each IoT device 12, or the IoT console 50 can communicate with another IoT console 50 through each respective physical communication protocol 14 of another IoT console 50. For example, if the physical communication protocol 14 of an IoT device 12 is TCP/IP communication protocol, and the physical communication protocol 14 of another IoT device 12 is Zigbee communication protocol, and the physical communication protocol 14 of a further IoT device 12 is Wi-Fi, then the IoT console 50 should have such physical communication protocols 14 including the TCP/IP communication protocol, Zigbee communication protocol and Wi-Fi to allow the IoT console 50 to communicate with each IoT device 12 through the respective physical communication protocol 14 of each IoT device 12.

The IoT console 50 may be a gateway, a router, a switch or a sharer, so that the IoT console 50 also has the function of another device.

Wherein, the IoT console 50 may be a mobile device which may be a mobile phone, a notebook computer, a flat PC or a personal digital assistant, so that the IoT console 50 also has the function of a mobile device.

Wherein, the plurality of physical communication protocols 14 included in the IoT console 50 are stored in a memory of the IoT console 50, wherein the type of the memory is not limited and it may be a flash memory, a firmware, an electrically-erasable programmable read-only memory (EEPROM), a random access memory (RAM), a hard disk, a floppy disk, an optical disk, etc.

Wherein, the OSI model is short for Open System Interconnection Reference Model, which is a concept model proposed by the International Standard Organization (ISO) and a standard framework of connecting various computers into a network in a global range. The OSI model comes with a 7-layer structure including a physical layer (Layer 1), a data link layer (Layer 2), a network layer (Layer 3), a transport layer (Layer 4), a session layer (Layer 5), a presentation layer (Layer 6), and an application layer (Layer 7).

Wherein, the virtual communication protocol 10 is set into the respective physical communication protocol 14 of each IoT device 12 which is equivalent to a position 16 of an application layer (Layer 7) of an OSI model. For example, the physical communication protocol 14 of an IoT device 12 is TCP/IP communication protocol which generally includes a four-layer model, wherein the first layer is a network port layer (which is equivalent to Layers 1 and 2 of the OSI model), the second layer is a network interconnection layer (which is equivalent to Layer 3 of the OSI model), the third layer is a transport layer (which is equivalent to Layer 4 of the OSI model), and the fourth layer is an application layer (which is equivalent to Layers 5 to 7 of the OSI model), and the TCP/IP communication protocol is equivalent to the position 16 of the application layer (Layer 7) of the OSI model which is also the application layer (Layer 4) of the TCP/IP communication protocol. Therefore, the virtual communication protocol 10 is set on the application layer (Layer 4) of the TCP/IP communication protocol.

Wherein, the virtual communication protocol 10 is set into the plurality of physical communication protocols 14 of each IoT console 50 which is equivalent to the position 16 of the application layer (Layer 7) of the OSI model. For example, the IoT console 50 includes but not limited to the following physical communication protocols 14: TCP/IP communication protocol, Bluetooth, Zigbee communication protocol, RS-232, Wi-Fi, Long Term Evolution (LTE), Radio Frequency Identification (RFID), or Near Field Communication (NFC) etc, and the application layer (Layer 4) of the TCP/IP communication protocol is equivalent to the position 16 of the application layer (Layer 7) of the OSI model, and the application layer (Layer 4) of the Zigbee communication protocol is equivalent to the position 16 of the application layer (Layer 7) of the OSI model, and many other physical communication protocols 14 are also equivalent to the position 16 of the application layer (Layer 7) of the OSI model, and they are prior art and thus will not be described further. Therefore, each physical communication protocol 14 of the IoT console 50 has the virtual communication protocol 10.

Each IoT device 12 not just can communicate with the IoT console 50 through its respective physical communication protocol 14 only, but also has a virtual communication protocol 10 capable of communicating with each respective global IoT address 17, so that the global IoT address 17 represents the address of the IoT device 12. The IoT console 50 is served as an interface and a virtual communication protocol 10 is used as a bridge, so that the IoT devices 12 of different physical communication protocols 14 can communicate with one another.

After the IoT console 50 of the parent node assigns a unique IoT address 13 to the IoT device 12 which requests for the data, the data transmitted from the IoT device 12 to the connected IoT console 50 are a first message packet which includes the respective physical communication protocol 14 of the IoT device 12 and the virtual communication protocol 10 equivalent to the position 16 of the application layer (Layer 7) of the OSI model, and the virtual communication protocol 10 includes an IoT source address, an IoT target address and at least one IoT command or request, wherein the IoT source address is the global IoT address 17 of the IoT device 12, and the IoT device 12 has a communication destination: a target IoT device, and the target IoT device is another IoT device 12 of the same IoT, and the IoT target address is the global IoT address 17 of the target IoT device, and the IoT command or request is the command or request transmitted from the IoT device and executed by the target IoT device.

Therefore, a package transmitted from the IoT device 12 to the IoT console 50 through the virtual communication protocol 10 is called the first message packet here, and the first message packet comprises the following structure:

A virtual communication protocol 10:
1. IoT source address: enddevice01
2. IoT target address: manager01
3. IoT command or request: read temp A physical communication protocol 14 (such as TCP/IP communication protocol):
1. Source address: 192.168.1.2
2. Target address: 192.168.1.1.

Figure 4:
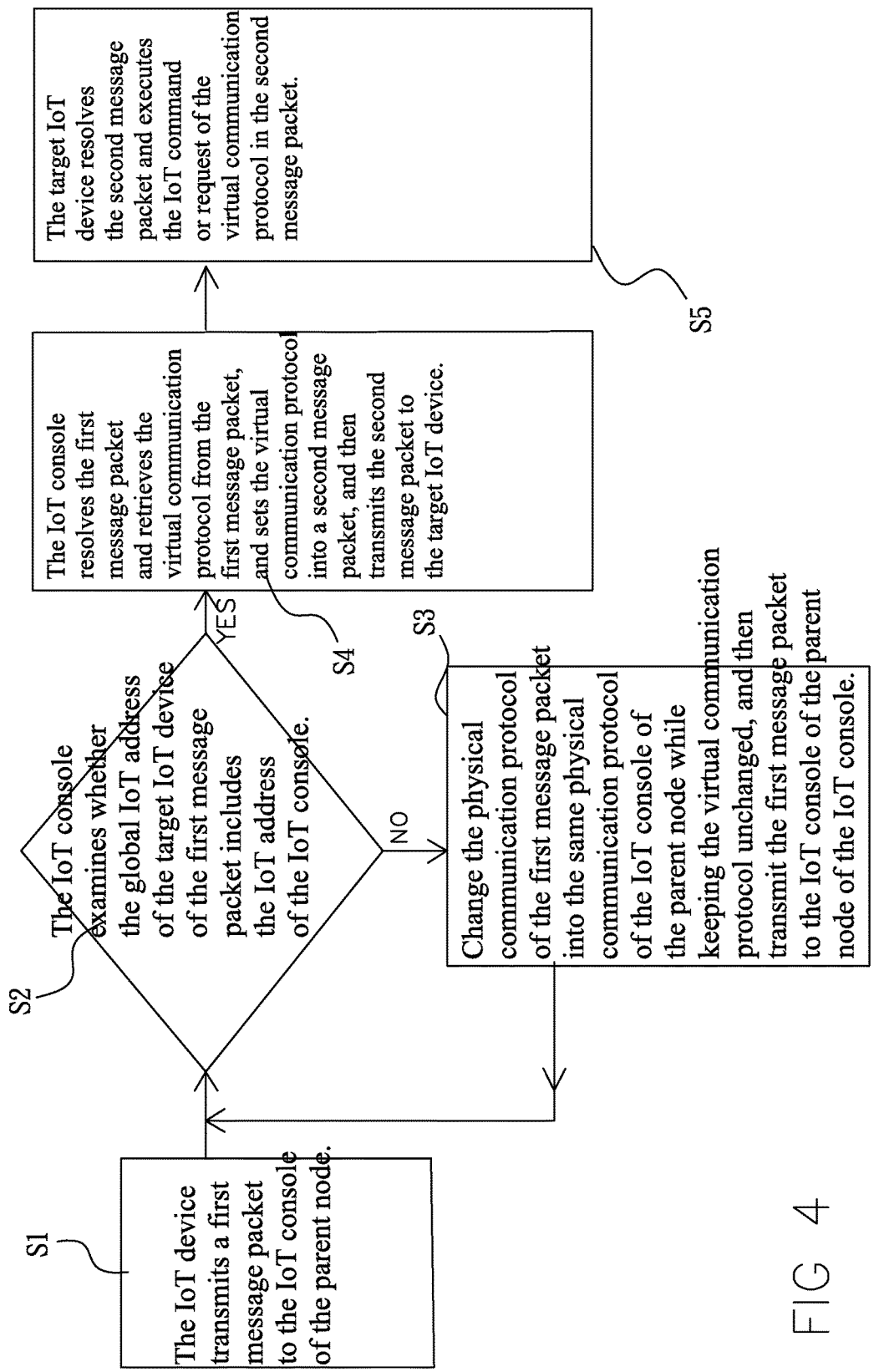
FIG. 4 is a flow chart of a method of applying the present invention for an IoT connection.

With reference to FIG. 4 for applying the present invention to an IoT connection method, and the IoT connection method comprises the following steps:

(S1): The IoT device 12 transmits a first message packet to the IoT console 50 of the parent node, and then Step 2 is executed.

(S2): The IoT console 50 examines whether the global IoT address 17 of the target IoT device of the first message packet includes the IoT address 13 of the IoT console 50; if yes, then Step 4 is executed, or else Step 3 is executed.

(S3): Change the physical communication protocol 14 of the first message packet into the same physical communication protocol 14 of the IoT console 50 of parent node while keeping the virtual communication protocol 10 unchanged, and then transmit the first message packet to the IoT console 50 of the parent node of the IoT console 50, and then Step 2 is executed.

(S4): The IoT console 50 resolves the first message packet and retrieves the virtual communication protocol 10 from the first message packet, and sets the virtual communication protocol 10 into a second message packet, and then transmits the second message packet to the target IoT device, and then Step 5 is executed.

(S5): The target IoT device resolves the second message packet and executes the IoT command or request of the virtual communication protocol 10 in the second message packet.

Wherein, the second message packet of Step 4 includes the respective physical communication protocol 14 of the child node of the IoT console 50, and such physical communication protocol 14 includes a source address and a target address in compliance with the specification of the physical communication protocol 14, so that the second message packet can be transmitted to IoT console 50 of the child node according to the physical communication protocol 14.

The virtual communication protocol 10 retrieved from the first message packet in Step 4 is set into a second message packet. Particularly, the virtual communication protocol 10 is set into the physical communication protocol of the second message packet which is equivalent to the position 16 of the application layer (Layer 7) of the OSI model, so that the virtual communication protocol 10 together with the physical communication protocol 14 can be transmitted to the IoT console 50 of the child node.

Through the hierarchical structure of the global IoT address 17 of the target IoT device of the virtual communication protocol 10, the obtained second message packet is transmitted to a path of the target IoT device, and the IoT console 50 of the child node uses the physical communication protocol 14 of the second message packet to change the physical communication protocol 14 of the IoT console 50 of each child node on the path while keeping the virtual communication protocol 10 unchanged, so that the second message packet can be transmitted to each node layer by layer, and finally the second message packet is transmitted to the target IoT device.

Figure 5:
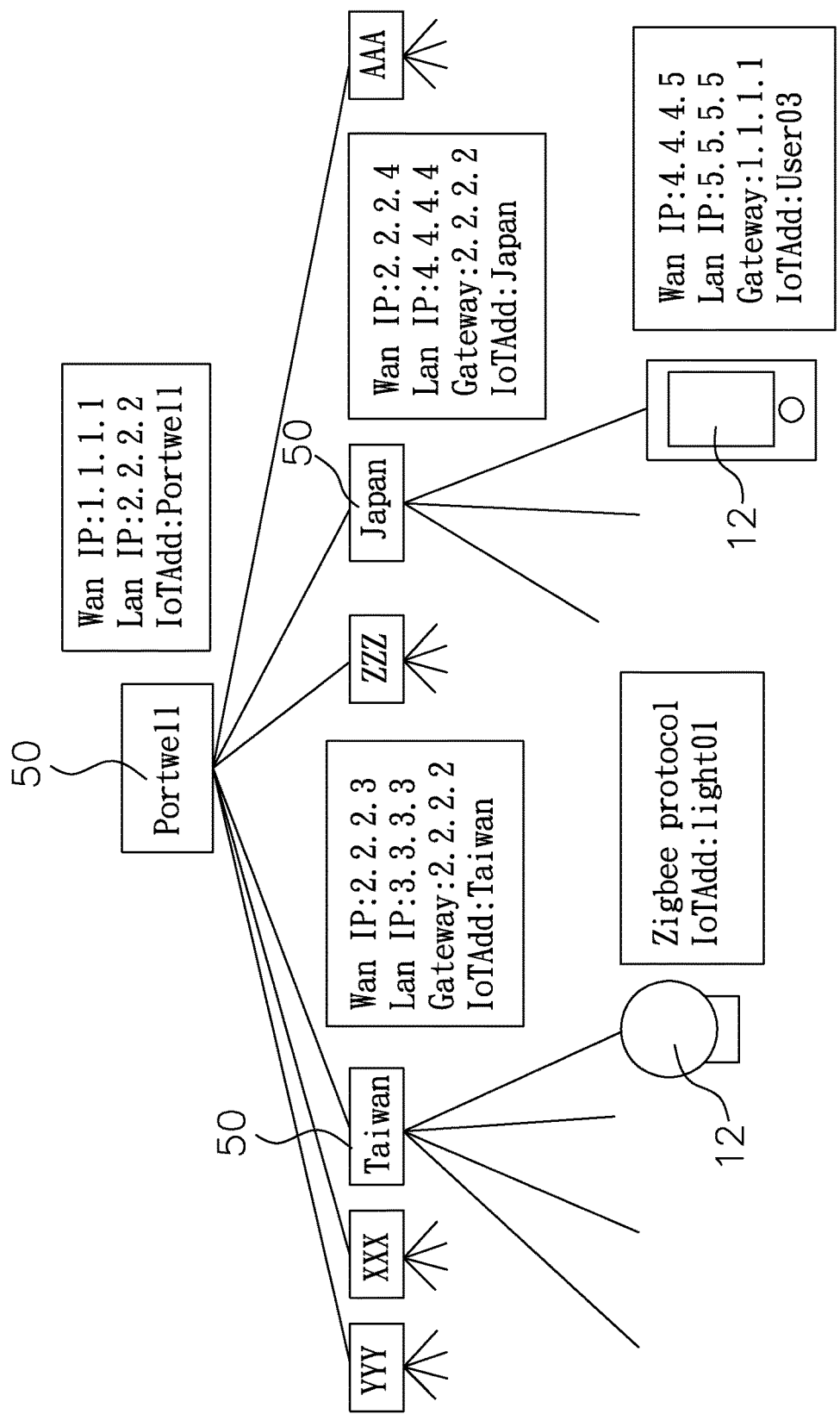
FIG. 5 shows an embodiment of a method of applying the present invention for an IoT connection.

With reference to FIG. 5 for an embodiment of an application of the present invention in an IoT connection method, a Japanese manager on a business trip turns on a red mobile phone (IoT device 12) to obtain an IoT address: User03 from a gateway (IoT console 50 with an IoT address: Japan) of a branch office, and the mobile phone transmits a command or request to a gateway with the IoT address in Japan, and the target is to transmit a command to another IoT device 12 with a global IoT address 17 [Portwell.Taiwan.light01], wherein the command may be [Power On]. After the IoT console 50 with the address in Japan receives the command, the devices managed by the IoT console 50 does not include the IoT device 12 with the address [Portwell.Taiwan.light01], so that Japan transmits such request to the IoT console 50: [Portwell] of its parent node, and the global IoT address 17: [Portwell.Taiwan.light01] has the hierarchical structure, and Portwell knows that the request is intended to be transferred to the IoT console 50 [Taiwan] of its child node, and the IoT console 50 [Taiwan] transmits the command to the IoT device 12: [light01] of its child node through the physical communication protocol 14 (Zigbee), and after the IoT device 12: [light01] has received the command of [Power On], the action of [Power On] will be executed.

From the description above, there is not limitation to the type of the connection when the present invention is applied for the IoT connection, and the virtual communication protocol 10 is set into physical communication protocol which is equivalent to the at the position 16 of the application layer (Layer 7) of the OSI model, so that the virtual communication protocol 10 together with the physical communication protocol 14 are connected and operated. In addition, the IoT is built on the existing network, and the global IoT address 17 comes with a design of the hierarchical structure, so that two IoT devices with different physical communication protocols can communicate or transmit control commands with each other on the IoT 80 with the hierarchical tree structure, and the IoT devices can communicate with one another in a quick and low-cost manner.

In the present invention, an IoT device may be connected to a plurality of IoTs, and the quantity of IoTs is not limited particularly.

While the invention has been described by means of specific embodiments, numerous modifications and variations could be made thereto by those skilled in the art without departing from the scope and spirit of the invention set forth in the claims.

What is claimed is:

1. A method of addressing IoT device and applying such for IoT connection, and the IoT device being executed in at least one IoT, and the IoT having a hierarchical tree structure, and the tree structure including a plurality of IoT devices, installed at a leaf node; an IoT console, installed at a root node; and a plurality of IoT consoles, installed at a middle layer, the method of addressing IoT device comprising the steps of:
   installing the IoT console installed at the root node with a unique IoT address;
   assigning, by each of the IoT console of each respective parent node, a unique IoT address to each IoT device and each of the plurality of IoT consoles installed at the middle layer;
   assigning each IoT device has a global IoT address which is composed of the IoT address of the IoT device and IoT addresses of ancestor node of the IoT console of the IoT device, and the global IoT address of each IoT device has a hierarchical structure; and
   assigning each IoT console has a global IoT address which is composed of the IoT address of the IoT console and IoT addresses of the IoT console of ancestor node of the IoT console, and the global IoT address of each IoT console has a hierarchical structure, wherein the global IoT address of each IoT device is composed of the plurality of IoT addresses arranged into a row and separated from one another by comma.

2. The method of addressing IoT device and applying such for IoT connection according to claim 1, wherein
   each of the plurality of IoT devices has its respective physical communication protocol equivalent to a position of an application layer (Layer 7) of the OSI model, and a virtual communication protocol, and each IoT device has a global IoT address set in each respective virtual communication protocol;
   each IoT console of an ancestor node of an IoT device has a plurality of physical communication protocols including a respective physical communication protocol of each IoT device or IoT console of the child node, and the physical communication protocols are equivalent to positions at the application layer (Layer 7) of the OSI model and each physical communication protocol has a virtual communication protocol, and each IoT console has a global IoT address set in each respective virtual communication protocol;
   each IoT device is connected to the IoT console of its respective parent node through the respective physical communication protocol and sends data for requesting an IoT address to the IoT console of its respective parent node, and then the IoT console of the parent node assigns a unique IoT address to the IoT device which requests for the data; and
   the IoT consoles not installed at the root node is connected to the IoT console of its respective parent node through the respective physical communication protocol and sends data for requesting an IoT address to the IoT console of its respective parent node, and then the IoT console of the parent node assigns a unique IoT address to the IoT console which requests for the data.

3. The method of addressing IoT device and applying such for IoT connection according to claim 2, wherein after the IoT console of the parent node assigns a unique IoT address to the IoT device which requests for the data, the data transmitted from the IoT device to the connected IoT console is a first message packet, and the first message packet includes a respective physical communication protocol of the IoT device and a virtual communication protocol equivalent to a position of the application layer (Layer 7) of the OSI model, and the virtual communication protocol includes an IoT source address, an IoT target address and at least one IoT command or request; and the IoT source address is the global IoT address of the IoT device, and the IoT device has a communication destination: a target IoT device which is another IoT device of the IoT, and the IoT target address is the global IoT address of the target IoT device, and the IoT command or request is a command or request transmitted from the IoT device and executed by the target IoT device.

4. The method of addressing IoT device and applying such for IoT connection according to claim 3, further comprising an IoT connection method, and the IoT connection method comprising the steps of:
   (Step 1) transmitting a first message packet from the IoT device to the IoT console of the parent node, and then executing Step 2;
   (Step 2) examining whether the global IoT address of the target IoT device of the first message packet by the IoT console includes the IoT address of the IoT console, if yes, then Step 4 will be executed, or else Step 3 will be executed;
   (Step 3) changing the physical communication protocol of the first message packet to the same physical communication protocol of the IoT console of its respective parent node, but keeping the virtual communication protocol unchanged, and then transmitting the first message packet to the IoT console of the parent node of the IoT console, and then executing Step 2;

(Step 4) resolving the first message packet by the IoT console and retrieving the virtual communication protocol from the first message packet, and placing the virtual communication protocol into a second message packet, and then transmitting the second message packet to the target IoT device, and then executing Step 5;

(Step 5) resolving the second message packet by the target IoT device, and executing the IoT command or request of the virtual communication protocol in the second message packet.

5. The method of addressing IoT device and applying such for IoT connection according to claim 4, wherein the second message packet of Step 4 includes a respective physical communication protocol of the child node of the IoT console, and the physical communication protocol includes a source address and a target address in compliance with its specification, so that the second message packet may be transmitted to the IoT console of the child node according to the physical communication protocol; and the virtual communication protocol retrieved from the first message packet in Step 4 is set into a second message packet, and the virtual communication protocol is set into the physical communication protocol of the second message packet equivalent to the position of the application layer (Layer 7) of the OSI model, so that the virtual communication protocol together with the physical communication protocol are transmitted to the IoT console of the child node;

the second message packet obtained from the hierarchical structure of the global IoT address of the target IoT device of the virtual communication protocol is transmitted to a path of the target IoT device, and the IoT console of the child node changes the physical communication protocol of the second message packet into the physical communication protocol of IoT console of each child node on the path layer by layer, while keeping the virtual communication protocol unchanged, so that the second message packet is transmitted to each node layer by layer, and finally the second message packet is transmitted to the target IoT device.

6. The method of addressing IoT device and applying such for IoT connection according to claim 2, wherein the physical communication protocol includes TCP/IP communication protocol, Bluetooth, Zigbee communication protocol (Zigbee), RS-232, Wi-Fi, Long Term Evolution (LTE), Radio Frequency Identification (RFID) or Near Field Communication (NFC).

7. The method of addressing IoT device and applying such for IoT connection according to claim 2, wherein the IoT console is a gateway, a router, a switch or a sharer.

8. The method of addressing IoT device and applying such for IoT connection according to claim 2, wherein the IoT console is a mobile device.

9. The method of addressing IoT device and applying such for IoT connection according to claim 8, wherein the mobile device is a mobile phone, a notebook computer, a flat PC or a personal digital assistant.

10. The method of addressing IoT device and applying such for IoT connection according to claim 2, wherein the physical communication protocols included in the IoT console are stored in a memory of the IoT console.

* * * * *